United States Patent [19]

Hocquellet

[11] Patent Number: 5,380,556
[45] Date of Patent: Jan. 10, 1995

[54] PART MADE OF A CARBON-CARBON COMPOSITE WITH AN SIC SURFACE-TREATED MATRIX RESISTANT TO OXIDATION AND A PROCESS FOR PRODUCING IT

[75] Inventor: Dominique Hocquellet, Médard en Salles, France

[73] Assignee: Aerospatiale Societe Nationale Industrielle, France

[21] Appl. No.: 6,819

[22] Filed: Jan. 21, 1993

[30] Foreign Application Priority Data

Jan. 20, 1992 [FR] France ............................ 92 00540

[51] Int. Cl.$^6$ .............................................. B05D 3/02
[52] U.S. Cl. .................................. 427/228; 264/29.1; 264/29.2; 427/249; 427/250; 427/430.1
[58] Field of Search ............................. 264/29.1, 29.2; 427/228, 249, 250, 430.1

[56] References Cited

U.S. PATENT DOCUMENTS

| | | | |
|---|---|---|---|
| 3,900,675 | 8/1975 | Olcott | 428/367 |
| 4,119,189 | 10/1978 | Ehrenreich | 192/107 M |
| 4,748,079 | 5/1988 | Thebault | 428/288 |
| 4,795,677 | 1/1989 | Gray | 428/246 |
| 4,848,414 | 7/1989 | Cahuzac | 139/411 |
| 4,863,660 | 9/1989 | Cahuzac et al. | 264/103 |
| 4,863,773 | 9/1989 | Rousseau et al. | 428/68 |
| 4,976,899 | 12/1990 | Rousseau et al. | 264/29.5 |
| 5,051,300 | 9/1991 | Rousseau | 428/245 |

FOREIGN PATENT DOCUMENTS

| | | |
|---|---|---|
| 2029382 | 5/1991 | Canada . |
| 0121797 | 10/1984 | European Pat. Off. . |
| 0133315 | 2/1985 | European Pat. Off. . |
| 0359614 | 3/1990 | European Pat. Off. . |
| 0427629 | 5/1991 | European Pat. Off. . |
| 2544661 | 10/1984 | France . |
| 2610951 | 8/1988 | France . |
| 2626570 | 8/1989 | France . |

OTHER PUBLICATIONS

Chemical Abstracts, vol. 108, No. 24, Jun., 1988, Columbus, Ohio, US; Abstract No. 209125n, p. 291 & JP-A-63 013 926 (Showa Denko KK) Jan. 21, 1988.
Material Research Bulletin, vol. 21, No. 11, Nov., 1986, Oxford, GB, pp. 1391-1395, I. Jawed et al.: "Oxidation Protection in Carbon-Carbon Composites".
Database WPIL, Week 8817, Derwent Publications Ltd., London, GB; AN 88-114984, & JP-A-63 060 173 (Sumitomo Elec. Ind. KK), Mar. 16, 1988.
Patent Abstracts of Japan, vol. 15, No. 436 (C-882), Nov. 7, 1991, & JP-A-31 83 659 (Nissan Motor Co. Ltd.), Aug., 1991.
Carbon, vol. 27, No. 3, pp. 381-387, 1989, GB: "Mechanical Behaviour of Carbon-Carbon Composites Made with Surface Treated Carbon Fibers", L. M. Manocha et al.
Chemical Technology Review No. 162, "Carbon and Graphite Fibers Manufacture and Application", pp. 198-225.

*Primary Examiner*—James J. Bell
*Attorney, Agent, or Firm*—Pearne, Gordon, McCoy & Granger

[57] ABSTRACT

A structural part made of carbon-carbon composite with a matrix surface-treated with SiC, resistant to oxidation and a process for manufacturing it.

According to the invention, the structural part has a fibrous preform (2) composed solely of carbon fibers (4) immersed in a matrix (6) of carbon whose porosities (7, 8) contains ultrafine crystalline SiC powder (10) that serves as a gaseous diffusion barrier. The quantity of crystalline SiC powder is 5% to 30% by weight of the preform-matrix-powder unit. This part can resist up to 1700° C. without external protection against oxidation.

16 Claims, 2 Drawing Sheets

PART MADE OF A CARBON-CARBON COMPOSITE WITH AN SIC SURFACE-TREATED MATRIX RESISTANT TO OXIDATION AND A PROCESS FOR PRODUCING IT

This invention concerns a structural mechanical part made of a carbon-carbon-type composite rendered non-oxidizing at high temperatures, especially up to 1700° C. with no external anti-oxidation protective coating, as well as a process for producing Structural parts made of a carbon-carbon type composite have high-performance thermal stability and are intended specifically for use in the manufacture of space vehicles (shuttles or spacecraft) that must resist heating caused by air friction during their high-speed re-entry into the atmosphere.

These space vehicles are particularly those whose re-entry missions entail—at some individual points that are more stressed than others such as the nose, the ailerons or the leading edges of the wing—exposure to severe conditions, in particular temperatures ranging up to 1700° C. at air pressures ranging up to $10^5$ Pa or exposure of certain parts to variable temperatures (from 1000° C. to 1700° C.).

However, the invention also applies to other branches of industry where parts made of refractory material that maintains its good mechanical properties above 1100° C. in a corrosive medium are used. This is especially true of improved-performance turbine engines working at high temperature (from 1300° C. to 1400° C.) and certain industrial air heaters.

The mechanical parts made of composites to which the invention applies are composed of reinforced carbon fibers immersed in a carbon matrix.

The fibers can be short or long, woven or coiled, plaited or braided. They can be arranged in one, two, three, four or more directions.

The basic advantage of carbon-carbon materials is that they maintain their mechanical integrity up to 3000° C., or even higher, when heated quickly. Unfortunately, these materials have the disadvantage of oxidizing to a large extent in the presence of air starting at 400° C.

Different processes have been devised to prevent this oxidation. The anti-oxidation technique used most is based on the use of an external covering, generally of silicon carbide. Such protection, hereafter called external anti-oxidation protection (AOP), is described specifically in the documents U.S. Pat. No. 4,863,773, U.S. Pat. No. 4,976,899, FR-A-2 635 773, FR-A-2 654 094.

Other external coverings of carbon-carbon materials have been devised as a mixture of $SiC/Si/Al_2O_3$ as described in the document EP-A-0 133 315 or as a coating of silicon nitride, as described in the document EP-A-0 121 797.

Alongside these external coatings, protective layers of silicon carbide surrounding each carbon fiber have been devised, as described in the documents EP-A-0 121 797 and U.S. Pat. No. 4,976,899.

In order to optimize the mechanical properties of the carbon-carbon composites, the fiber-matrix bond must be optimized in such a way that it is neither strong nor weak, due to the fragility of the matrix and due to the fact that the fragility should not be propagated in the fibers. For that reason, when each fiber must be protected with SiC, there must also be a deposit of pyrolyric carbon, which consequently increases the manufacturing cost of carbon-carbon materials.

Moreover, attempts have been made for a long time to make carbon-carbon composites non-oxidizing in mass by incorporating varied loads in their matrix.

On this subject, the document U.S. Pat. No. 4,795,677 describes the introduction, into the carbon matrix, of particles of zirconium boride and boron which oxidize and form a very fluid glass, $B_2O_3$, which spreads out inside the material.

Besides protecting the composite, this American document uses an external covering of $B_2O_3$ modified to adapt its viscosity to it.

The protection of the carbon-carbon material is due to expansion during the formation of the $B_2O_3$ and especially to the formation of a layer of $B_2O_3$ which keeps out the oxygen.

Due to the fact that the $B_2O_3$ is very fluid and vaporizes easily at high temperatures, additives are necessary. Choosing these additives is very delicate, since the viscosity and wettability properties of the glass must not vary too much in the temperature range mentioned.

The article Mat. Res. Bul., vol. 21, pp. 1391–1395, 1986 "Oxidation Protection in Carbon-Carbon Composites" by I. Jawed and D. C. Nagle describes the oxidation protection of a carbon matrix using organic-metallic precursors to form in situ amorphous SiC and $B_4C$, which oxidize respectively into $SiO_2$ and $B_2O_3$.

The tests were performed in an oven at 1000° C. and 1500° C., and the gains in oxidation protection were small, which led the authors of the article to the need to protect the composites with one or more external coatings of refractory inorganic material.

The oxidation of amorphous SiC into $SiO_2$, according to I. Jawed and D. C. Nagle, caused the cracks inherent in the material to be sealed, thus preventing the oxygen from reaching the carbon. This sealing results either from a behavior of the $SiO_2$ identical to the one described for $B_2O_3$ (coating that keeps out the oxygen), or from the major expansion which is produced, SiC is converted into $SiO_2$.

The $B_2O_3$, including in a mix with other oxides such as $SiO_2$ or $ZrO_2$, becomes volatile above 1000° C. Thus, the protection that it can offer disappears above that temperature.

Boron oxide can be produced by the oxidation of boron nitride or a metal boride. The use of boron nitride and metal boride is explained in the document U.S. Pat. No. 4,119,189.

Document FR-A-2 104 563 describes the creation of a composite pyrolytic material composed of an interleaved pyrolytic graphite matrix and silicon carbide. This matrix is obtained by simultaneous chemical vapor deposition (CVD) of SiC and graphite on a porous substrate. The amount of SiC in the matrix can be up to 95% by volume. This very high quantity of SiC causes embrittlement of the composite, as the SiC is much less mechanically resistant than the carbon.

Moreover, since the chemical vapor deposition process does not infiltrate very much, thick composites cannot be made.

It is also known from documents U.S. Pat. No. 4,976,899 and U.S. Pat. No. 4,863,773 how to introduce SiC into the carbon matrix by pyrolyzing precursor resins of carbon onto which Si—O bonds have been grafted.

This method of introducing SiC into the carbon matrix, in the absence of any external coating of SiC on the composite, does not make it possible to ensure effective oxidation protection of the material.

For oxidation protection of carbon-carbon materials, whose matrix is the result of the pyrolysis of a pitch, adding ZrC or TiC powder into the impregnation pitch is known from document FR-A-2 626 570. The operating principle of ZrC and TiC is the same as that for $B_4C$ with partial oxidation of the carbides.

The different techniques for protecting carbon-carbon composites from oxidation described above are either very complex and thus burdensome (in particular, due to differences in the coefficients of thermal expansion, the use of an external SiC coating requires that materials be used to plug cracks in the SiC coating—see documents U.S. Pat. No. 4,976,899, EP-A-0 121 797), or they afford limited protection against oxidation, particularly at high temperature (see U.S. Pat. No. 4,795,677 or the publication by I. Jawed).

The object of the invention is a structural mechanical part made of a new carbon-carbon composite protected against oxidation, as well as a process for manufacturing it, that makes it possible to remedy the various disadvantages mentioned above. This part made from a composite has great mechanical stability and oxidation resistance up to a temperature of 1700° C., with no external protective coating, particularly in the presence of an oxidizing gaseous flow.

This part is much simpler to produce, and thus less expensive than those of the prior art.

It also cuts the oxidation speed at least in half between 1000° C. and 1700° C., with no external covering, in the presence of a mass flow of oxygen above 0.005 Kg/m$_2$/s.

In addition, its effectiveness in terms of oxidation is greater than that of the carbon-carbon materials of the prior art, since, contrary to the other parts, the greater the oxygen aggression, the more effective the protection.

In addition, this mechanical part of composite, particularly due to its manufacturing simplicity, may be greater than one meter in diameter and can form the nose of a shuttle, for example.

What is more, the mechanical properties of this part are improved compared to those of the parts of the prior art, and no coating is necessary between the fibers and the matrix to ensure adequate mechanical connection between them, as described in the document FR-A-2 544 661.

The physical principle used in the invention is totally different from those used up until now and described above; it is especially well suited for the same type of oxidation conditions as those of re-entry into an oxidizing atmosphere. In this case, the oxygen flow and the temperatures involved are very high, and the oxidation speeds of an unprotected carbon-carbon material can reach an average of 1 mm per minute during re-entry.

The principle behind the invention consists of creating a gaseous diffusion barrier on the surface of the material. Thus, the stronger the oxidation conditions, the more effective the barrier.

A gaseous diffusion barrier is much easier to produce than a gas-tight coating sought until now, due to the fact that a perfect seal is not needed; the aerodynamic flow need only be prevented from reaching the oxidation front. In this case again, the fibers are protected simultaneously with the matrix, and no specific action need be taken on this point. When the gaseous diffusion barrier is produced, the oxidation kinetics of the composite part are guided by the diffusion of oxygen in the gaseous state; the laws of kinetics are parabolic-type laws.

According to the invention, this diffusion barrier is formed by SiC powder located particularly in the large porosities of the composite. In the presence of oxygen, this SiC oxidizes into $SiO_2$ and bonds the different particles to one another to create the barrier.

This principle, which is completely new, effectively reduces the oxidation speeds of the composite in the presence of an oxidizing flow. This effectiveness of the oxidation protection, inter alia, means that the fibers of the material have absolutely no need to be coated with pyrolytic carbon, SiC coatings or other protective coatings.

In addition, effective oxidation protection can be obtained without having to cover the whole composite part with one or more external coatings of inorganic refractory material, contrary to all the techniques known to date for adding particles to slow down oxidation to the matrix of the part.

The composite part in the invention is therefore much simpler than those of the prior art, and its implementation is much less expensive.

More precisely, the object of the invention is a structural part made of a composite that is protected against oxidation and includes a fibrous preform composed solely of carbon fibers immersed in a carbon matrix whose porosities contain an ultrafine powder of crystalline silicon carbide that serves as a gaseous diffusion barrier. The quantity of powder is from 5% to 30% by weight of the preform-matrix-powder unit.

Throughout the text, the percentages of the different components of the composite are given for a material without external anti-oxidation protection.

Preferably, from 5% to 20% by weight SiC is used in relation to the preform-matrix-powder unit. If the quantity of SiC is >30% by weight, the mechanical properties of the part degrade.

The carbon-carbon part in the invention has oxidation-resistance properties with no protective coating of the fibers in a temperature range up to 1700° C. The matrix, which is reinforced and surface-treated, by itself has a greater capacity for oxidation resistance and provides protection for the part.

The commercial carbon fibers currently being looked at to produce the composites with a polymer matrix must have a good fiber-matrix bond so that the forces are transmitted from the fibers to the matrices. For this, the carbon fiber manufacturers voluntarily pre-treat the final fibers by oxidizing them, either electrochemically or thermally.

Such treatment is described in the document "Mechanical behavior of carbon-carbon composites made with surface-treated carbon fibers" by L. M. Manocha et al., Carbon Vol. 27, No. 3, pp. 381–387, 1989 and in the document Chemical Technology Review No. 162, "Carbon and graphite fibers; manufacture and applications" by Marshal Sitting, edited by Noyes Data Corporation (NDC), 1980, pp. 198 to 225.

In order to optimize the mechanical properties of the part made of carbon-carbon composite in the invention, carbon fibers are used that have had no voluntary final treatment. In this case, the fiber-matrices bonds are weaker than those obtained with fibers that have been subjected to final treatment, which is the objective sought, due to the brittleness of the matrix and due to the fact that this brittleness should not spread through the fibers. This also reduces the manufacturing cost of the composites.

The part in the invention is intended specifically for structural elements like the nose, ailerons or leading edges of a spacecraft. In his case, the volume of fibers, which represents the ratio of the volume occupied by the fibers to the tonal volume of the material is $\geq 40\%$ and, in practice, is from 45% to 60%. Moreover, the fibers used are preferably continuous and oriented in more than two directions.

The SiC powder used must have grains whose average diameter is less than 1/10 of the diameter of the fibers. Thus, for carbon fibers with fiber diameters from 5 to 10 82 m, the powder should have submicronic granulometry.

Preferably, powders with granulometry ranging from 0.1 $\mu$m to 0.6 $\mu$m are used. When the granulometry is too fine, there is no agglomeration of the grains, and when the granulometry is too high, the grains cannot lodge in the porosities in the matrix.

Such granulometry suffices due to the fact that the powder does not necessarily need to get into the fibers, it must simply go into the porous places between the fibers (cracks or pockets—rings in the case of materials woven by the 3D technique—). Pockets (or rings) refer to the gaps on the substrate that are between the fibers before its densification.

The powder is introduced into the part in the invention at the same time as densification. Thus, no additional step, compared to make a non-surface-treated and therefore unprotected carbon-carbon part, is necessary to protect it from oxidation.

According to the invention, the carbon matrix is at least partially the result of pyrolysis of the polymerized carbon precursor resin.

The composite part described previously has been developed for use on a spacecraft that flies only one mission. For multi-mission use, it is preferable to create external oxidation protection that covers the entire external surface of the part.

This external protection or external anti-oxidation protection (AOP) is composed of one or more external ceramic coatings. This external coating can be made of SiC, $Si_3N_4$ or a refractory oxide such a $ThO_2$, $ZrO_2$, $HfO_2$, $La_2O_3$, $Y_2O_3$ and $Al_2O_3$.

When a coating of SiC is used as an external coating, it cracks due to the difference in the coefficients of thermal expansion between the carbon of the matrix and the fibers and the SiC of the external coating. Then these cracks must be filled by depositing a coating of refractory oxide, such as those mentioned previously, on this SiC coating.

In order to avoid a chemical reaction between the carbide in the external SiC coating and the oxide coating, an intermediate coating can be used as a reaction barrier. One of those described in the document FR-A-2 635 773 can be used as an intermediate coating.

Preferably the intermediate reaction-barrier coating is made of ALN or HfN.

To fill cracks in the external coating of SiC, it is also possible to use silicon and/or a borosilicated glass ($SiO_2$—$B_2O_3$) as described in the document U.S. Pat. No. 4,863,773.

In the absence of the external coating of SiC, it is preferable to interpose between the external oxide coating and the underlying carbon-carbon material an intermediate reaction-barrier coating such as the one described in the document FR-A-2 635 773.

Whatever the composition of the anti-oxidation protection (AOP), the oxide coating of which it is formed is generally the most external coating.

For a mechanical part with AOP, as described previously, the underlying material enclosing the SiC powder serves as a safety element in case of accidental deterioration of the AOP (for example hail or meteorites for a spacecraft). In this case, the spacecraft could re-enter the atmosphere with no problem. The SiC powder introduced into the matrix then serves as a second level of oxidation protection for the part, with the first level of protection being ensured by the AOP.

The object of the invention is also a process for manufacturing a part made of the composite as described previously.

Depending on the nature of the fibrous preform, the carbon fibers can be impregnated with the carbon precursor resin and the SiC powder before or after the fibrous preform is formed.

Thus, a first process consists of: (a) making a fibrous preform of the part, composed solely of carbon fibers, (b) impregnating this preform with an impregnation bath containing a carbon precursor resin and ultrafine crystalline SiC powder; the quantity of SiC powder in the bath is such that it represents from 5% to 30% by weight of the densified preform; (d) polymerizing the resin of the loaded preform, then pyrolyzing it to convert it into carbon and thus densify the loaded preform.

A second process consists of: (A) impregnating at least one carbon fiber with an impregnation bath containing a carbon precursor resin and the ultrafine SiC crystalline powder, the quantity of SiC powder in the bath being such that it represents from 5% to 30% by weight of the densified preform, (B) making a fibrous preform of the part, composed solely of this impregnated carbon fiber, (C) polymerizing the resin of the loaded preform, then pyrolyzing it to convert it into carbon and thus densify the loaded preform.

In contrast, in documents U.S. Pat. No. 4,976,899 and U.S. Pat. No. 4,863,773, SiC surface-treating the carbon matrix according to the invention is not done with carbon precursor resins that have functional groups with Si—O bonds. The resins that can be used in the invention can therefore be those normally used in the manufacture of carbon-carbon parts not protected against oxidation.

The process in the invention can therefore be implemented with the same means as those used industrially in the manufacture of unprotected carbon-carbon parts. Thus, the mechanical properties of the mechanical part can be optimized better than the processes using modified resins.

The resins used in the invention are therefore chosen on other criteria than that of the oxidation-resistance of the part. For example, they are the phenol-formaldehyde, furanic type, polyfurfurylic alcohol, polydiethylmethylbenzene, polybenzimidazol, etc. For reasons of mechanical behavior, modified resins can also be used that introduce SiC or BN into the matrix during pyrolysis.

Advantageously, the impregnation bath contains 10 to 100 parts by weight SiC powder and 0 to 10 parts by weight solvent for 100 parts by weight resin.

As previously indicated, the principle used in the invention is oxidation protection using a gaseous diffusion barrier.

Thus, the object of the invention is also a process for oxidation protection in the face of an oxidizing gaseous flow up to 1700° C. of a composite with carbon fibers bonded together by a carbon matrix, that consists of forming a gaseous diffusion barrier made of porous $SiO_2$ in the matrix by conversion of an ultrafine SiC crystalline powder placed in the gaps of the matrix at the rate of 5% to 30% by weight of the fiber-matrix-powder unit.

Other characteristics and advantages of the invention will be better understood from the following description, which is given as an illustration and is not limiting, and refers to the appended drawings, in which:

FIG. 1a shows schematically a part made of composite in accordance with the invention and FIG. 1b shows schematically the operating principle behind the protection used on the part in FIG. 1a.

Figure 1:
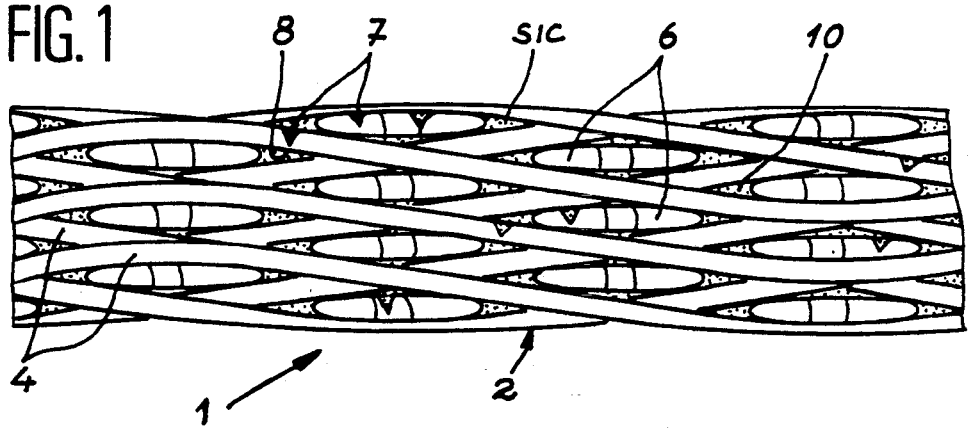

The part made of composite shown in FIG. 1 is a plane plate 1 composed of a fibrous preform made solely of untreated continuous carbon fibers 4 woven according to the 2.5D technique described in document FR-A-2 610 951; the fibers 4 are actually strands composed of several hundred carbon fibrils.

These woven strands 4 are immersed in a carbon matrix 6 resulting from the pyrolysis of a polymerized resin that is a carbon precursor.

By way of example, the fibers 4 come from pyrolysis of polyacrylonitrile (PAN). They have a diameter of approximately 7 μm.

The resins used are, especially, phenolformaldehyde resins like Resol.

The ultrafine crystalline SiC powder 10 is lodged in the cracks 7 of the carbon matrix 6 and in the rings (or pockets) 8 between the woven strands 4. This powder has a granulometry less than 1/10 of the diameter of the fibers 4. In this particular case, the granulometry is <0.7 μm and is typically from 0.1 μm to 0.6 μm. The powder is from 5% to 30% by weight of the plate and typically 15% by weight.

Figure 1B:
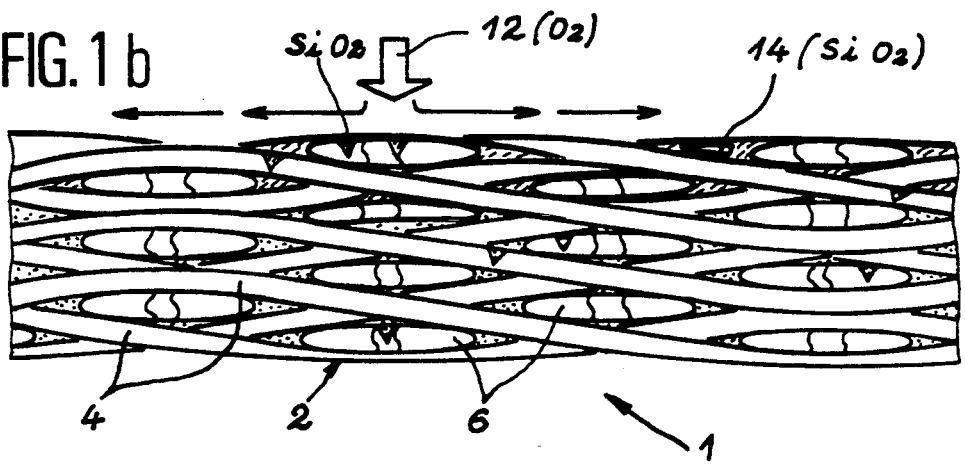

In FIG. 1a, the part made of composite in the invention is shown before being subjected to a flow of oxygen, and in FIG. 1b the same part is shown when it is subjected to a flow of oxygen 12.

As soon as the part is subjected to the flow of oxygen 12, the SiC powder 10 contained in the cracks 7 and the rings 8 is changed into porous $SiO_2$ while remaining in the same place, and the carbon in the SiC is consumed. Since the oxidized SiC remains in its place, a silicon oxide coating 14 is formed that represents the negatives of the porosities 7 and 8 of the initial part.

This porous $SiO_2$ oxide coating serves as a gaseous diffusion barrier and thus reduces the carbon consumption of the matrix and the fibers.

The more the oxidation advances, the more the coating 14 thickens and the more the part is protected from oxidation.

Using untreated fibers or strands 4 is compatible with any type of matrix and makes possible great flexibility in choosing the characteristics in terms of the fiber-matrix interface. Thus, no pyrocarbon-type coating (see FR-A-2 544 661) or SiC-type coating (see EP-A-427 629) is necessary to improve the fiber-machine bond.

Untreated fibers are used to optimize the mechanical properties of the composite part and to lower its manufacturing cost.

The loads of SiC add the aspect of oxidation resistance.

The following description concerns different examples of manufacture for parts made of composite, in accordance with the invention.

EXAMPLE 1

This example is described with reference to FIG. 2, which shows the different manufacturing steps for a structural part in accordance with the invention. This part is in the form of a plane plate whose fibrous preform is made with untreated continuous carbon fibers, woven according to the 3D technique described, for example, in document FR-A-2 612 950. These fibers come from pyrolysis of PAN.

Figure 2:
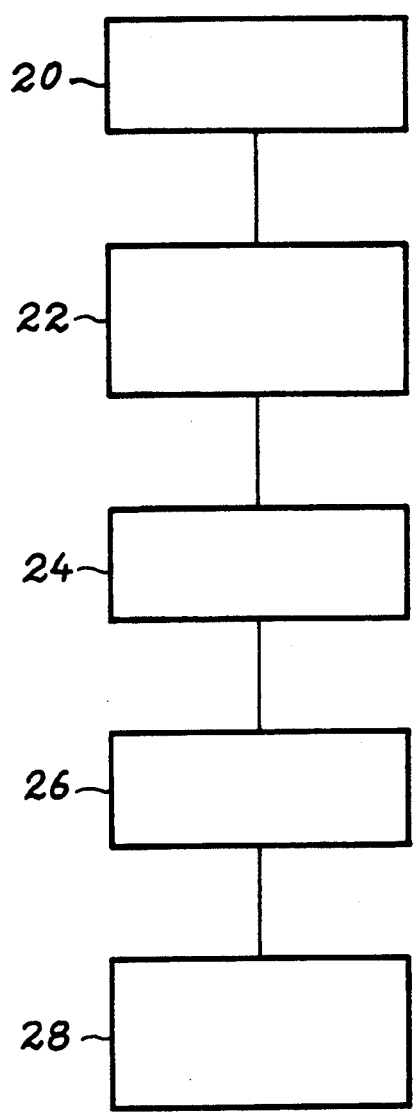
FIGS. 2 and 3 illustrate schematically the different manufacturing steps for various parts made of composite, in accordance with the invention, that do not have external AOP.

The making of the fibrous preform of the part is diagrammed in block 20 of FIG. 2.

The second step in the process, as shown in block 22, is to impregnate the fibrous preform with a mixture of carbon precursor resin and crystalline SiC powder. This mixture contains, in particular, 100 parts by weight phenolformaldehyde resin, from 10 to 100 parts by weight SiC powder and from 0 to 100 parts by weight solvent, such as a lower alcohol. The mixture is made carefully so as to be homogeneous and well dispersed. For this purpose, a dispersing machine is used, particularly an ultrasound dispersing machine.

By way of example, the mixture contains 100 parts by weight formophenolic resin, 50 parts by weight SiC powder, 50 parts by weight alcohol; the SiC powder is VF25 from Lonza with a granulometry between 0.1 and 0.6 μm.

When the mixture is homogeneous, the impregnation is done in a vacuum until the resin-SiC mixture no longer forms bubbles. The pressure prevailing in the vacuum container is $10^3$ Pa. Moreover, the container is brought to a temperature of 70° C. It takes 24 hours to impregnate the fibrous preform with the resin-SiC powder mixture.

The next step in the process, symbolized by block 24 in FIG. 2, consists of polymerizing the resin in neutral gas (nitrogen, argon) at a pressure of $10^5$ and at a temperature of 200° C.

Then the polymerized resin is converted into coke. This consists of pyrolysis at 850° C. for 3 hours in neutral gas at a pressure of $10^5$ Pa; this step is symbolized by block 26 in FIG. 2.

In order to reduce the porosities in the part to a value equal to or less than 5% (measured hydrostatically), additional densification is carried out, symbolized by block 28, consisting of one or more cycles of impregnation, polymerization and pyrolysis with the phenol resin alone. The number of cycles with the resin alone is generally from 1 to 3.

The mechanical part obtained is ready to use after possible machining.

EXAMPLE 2

Figure 3:
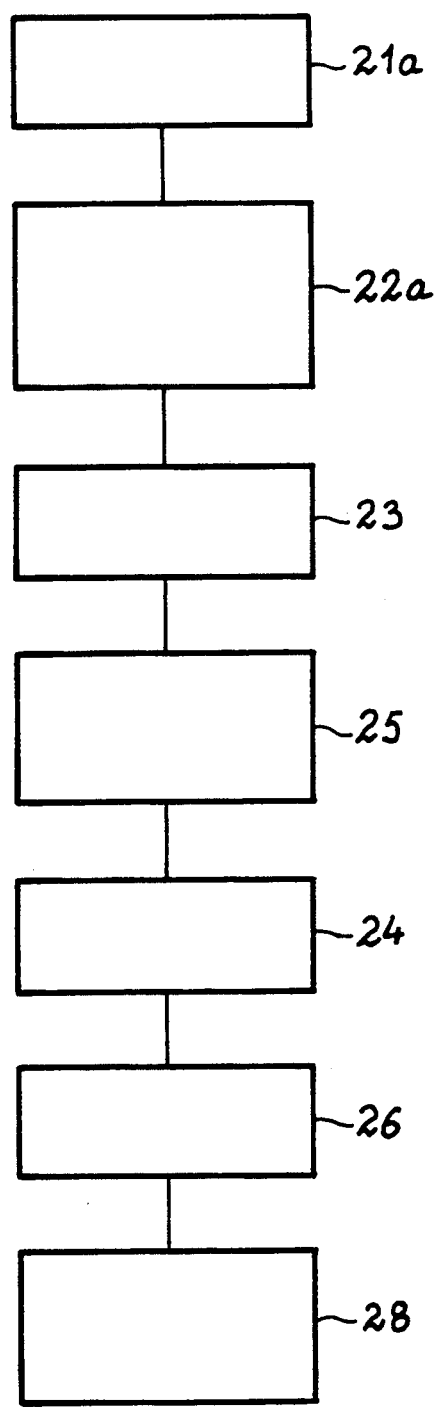

This example is described with reference to FIG. 3, which illustrates the different steps in the manufacture of the parts in the invention.

According to the same principle, the inventors made parts of a composite whose fibers were woven according to the 2D technique. First a fabric, as indicated in block 20a, made of continuous strands of untreated carbon located parallel to each other are made to form layers; the strands of two consecutive layers are perpendicular to one another.

At the same time, a mixture of phenol formaldehyde resin, carbon precursor and crystalline SiC powder with a granulometry of 0.1 μm to 0.6 μm is made. The mixture contains 100 parts by weight resin and 5 to 100 parts by weight SiC.

In order to improve the homogenization of the mixture, 0 to 30 parts by weight of a lower alcohol (containing 1 to 5 carbon atoms) like isopropanol can be added. Dispersion is carried out by ultrasound, as above.

Then, as symbolized by block 22a, the fabric 2D is immersed in a vacuum in the loaded resin until there are no more bubbles. The fabric is drip-dried for 30 minutes in the air at atmospheric pressure.

Next, it is dried in an oven at 80° C. for 1 hour in the open air in order to remove the excess resin. This step is shown in block 23.

The pre-impregnated fabric obtained can be stored in a cold room, at a temperature below −18° C. and wait to be used.

This fabric can be used in the following way:
cutting pieces of fabric,
stacking pieces of cut fabric in a mill whose shape is adapted to the structural piece to be made,
pressing these pieces of fabric cold at a pressure greater than $10^5$ Pa, then
polymerization, pyrolysis and finishing of the piece as described above.

The steps of cutting, stacking and pressing the pieces of fabric is step 25 in making the fibrous preform loaded with resin and SiC.

EXAMPLE 3

Before impregnating the fabric with the resin/SiC powder mixture as described in Example 2, it is also possible to pre-impregnate the fibers with pitch, at atmospheric pressure so as to increase the density of the carbon-carbon part.

EXAMPLE 4

The same thing can be done as in Example 2 by impregnating not only a fabric but some thread with the resin-SiC mixture to obtain a pre-impregnated thread, then weaving this pre-impregnated thread so as to obtain the desired architecture of the substrate. The sequence of polymerization, pyrolysis, etc. is the same.

EXAMPLES 5 AND 6

It is also possible to impregnate a fibrous preform with a resin-SiC mixture containing very little resin. For example, a suspension composed of an aqueous ammonia solution with a pH of 12, with 200 g/L of SiC powder (reference VF25 from Lonza) containing 10% by weight phenol resin will work.

The impregnation is then carried out as in Example 1 in a vacuum until the mixture no longer forms bubbles; the pressure is then $10^3$ Pa. The polymerization of the resin and its pyrolysis are also carried out according to Example 1.

This method is of interest because it is then possible to finish the densification (step 28) by impregnating the part already densified with pitch or by depositing carbon by chemical vapor deposition instead of carrying out only the resin impregnation, polymerization and pyrolysis cycles described for that resin in Example 1, so as to obtain a denser carbon matrix that is a better conductor of heat.

The composite parts described above had no external AOP; the parts were protected against oxidation only by the SiC powder introduced into the matrix.

Figure 4:
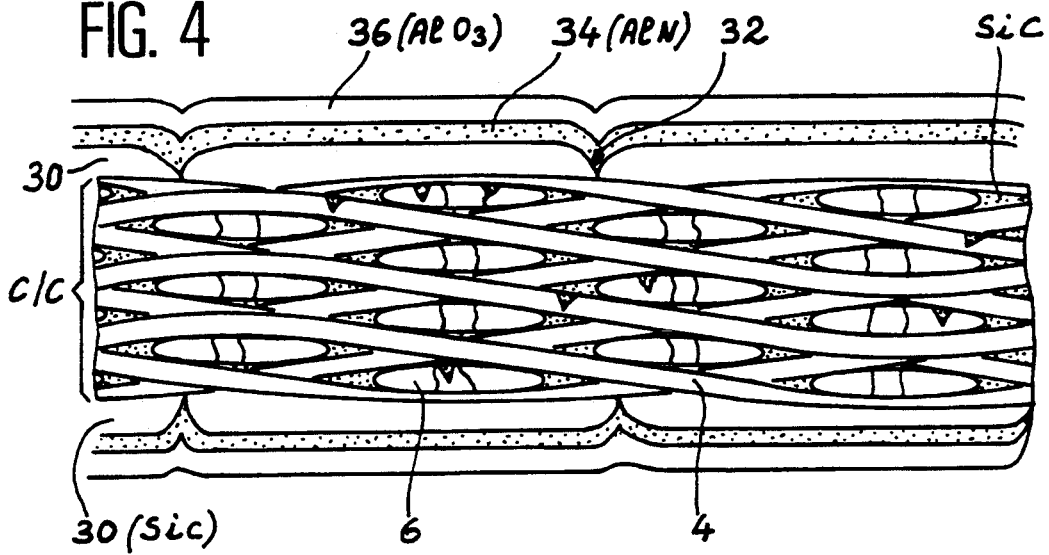
FIG. 4 illustrates schematically a part made of composite in accordance with the invention, which has external AOP.

For spacecraft that must perform several missions, it is desirable to add external AOP to the part, as shown in FIG. 4.

This part differs from the one in FIG. 1 only by the presence of the AOP. The latter includes an external coating 30 of SiC over its entire external surface, from 300 to 500 μm thick, obtained by surface silicification of the carbon of the matrix 6 and the fibers 4. This is done by immersing the part, for example, in a mixture of $Al_2O_3$, Si and SiC powder at 1700° C.

This silicification can be followed by depositing SiC by chemical vapor deposition so as initially to fill the cracks 32 formed in the SiC coating 30 due to the differences in the heat coefficient between the carbon and the silicon carbide. This filling is done at 950° C. with a mixture of $H_2$ and $CH_3SiCl_3$.

Then, an intermediary coating 34 of ALN approximately 0.2 to 3 μm thick is deposited and covers the entire external coating 30 of SiC. This ALN coating is obtained by chemical vapor deposition at 950° C. by using a mixture of $AlCl_3$, $H_2$ and $NH_3$. It serves as a diffusion barrier between the external coating 30 of SiC and the final aluminum protective coating 36.

This aluminum coating 36 is deposited by chemical vapor deposition at 950° C. by using a mixture of $AlCl_3$, $H_2O$ and $CO_2$. It is 2 to 100 μm thick.

The conditions for the deposition of the SiC, ALN and $Al_2O_3$ coatings are those given in the document U.S. Pat. No. 5,051,300.

Different 2.5D-type carbon-carbon composites have been tested. The fibers were untreated fibers organized in strands 7 μm in diameter, obtained from PAN. The carbon matrix comes from a phenol formaldehyde resin. The materials were 2.5 mm thick.

Sample No. 1 in the reference has a density of 1.56 and, as anti-oxidation protection, a stack of SiC and boro-silicate glass coatings as described in document U.S. Pat. No. 4,976,899.

Sample No. 2, in accordance with the invention, contains SiC powder with a granulometry of 0.1 to 0.6 μm; impregnation was done in a mixture containing 50 parts by weight crystalline SiC to 100 parts by weight resin, which represents 10 to 12% by weight SiC in the composite. It has a density of 1.63.

Sample No. 3 is a composite that has no protection against oxidation, with a density of 1.56.

Sample No. 4 is a composite containing 8% by weight BN powder, with a density of 1.55.

Sample No. 5 is a composite surface-treated with SiC introduced from a modified resin. It contains 4% by weight amorphous SiC and has a density of 1.63.

The tests were performed with an oxidizing adjustable oxyacetylene blowtorch. During the tests, the temperature was kept constant. The temperature of the torch was measured with a thermocouple.

Non-surface-treated C/C Material (No. 3)

This material has the fastest oxidation speeds at all temperatures. In addition, it was noted that the speed increases quickly with the temperature. There was systematic piercing of the samples.

C/C Material with Matrix Surface-treated with SiC Powder (No. 2)

For this type of material, there are two separate cases:

Below 1700° C., the oxidation speed is slow, and it increases, although slowly, with the temperature. This oxidation speed varies between half and one third that of the non-surface-treated material. In this temperature range, there is no piercing of the material, but a grey coating of porous $SiO_2$ is formed that remains on the surface of the samples.

Above 1700° C., the oxidation speed increases quickly, still remaining below that of the non-surface-treated C/C. In this temperature range, there is piercing of the material; the $SiO_2$ coating still exists but has a tendency to melt.

This material therefore has an oxidation speed at least twice as low as the non-surface-treated composite between 800° and 1700° C. (transition temperature).

The same results were obtained for an SiC powder compound whose resin was a "modified SiC" resin.

C/C Material with Surface-treated BN Matrix (No. 4)

This material is characterized by very low oxidation at 800° C. but from 1000° C. the behavior of this material is like that of the non-surface-treated material, with piercing of the material. Hence its effectiveness disappears above 1000° C.

C/C Material with "Modified SiC" Resin (No. 5)

This material has a lower transition temperature than that of the composite surface-treated with SiC powder. At temperatures below 800° C., this material has a very slow oxidation speed, but from 1000° C., the oxidation speeds become greater than those of the material surface-treated with the SiC powder. Lastly, after 1350° C., this material behaves identically to the one with the non-surface-treated composite.

Hence its effectiveness disappears above 1350° C.

Tests with a plasma torch, simulating the conditions for re-entry into the atmosphere of a spacecraft at 1500° C. and an atmospheric pressure of $75 \times 10^2$ Pa have been conducted on different materials. The results are shown in Table I below.

In this table, the oxidation speeds are expressed in g/min and in mm/min. The losses of mass are expressed by weight before and after the oxidation test and the losses of thickness are measured by initial and final measurement with a micrometer for the non-surface-treated, modified resin C/C composites and by initial and final measurement with a micrometer by micrography for materials with a protective cushion.

TABLE I

| MATERIAL | LENGTH OF STAGE | LOSS OF MASS (g/min) | ABLATION SPEED (mm/min) |
|---|---|---|---|
| C/C 2.5D non-surface-treated | 2 | 0.63 | 0.74 |
| C/C 2.5D with surface-treated SiC matrix | 1.8 | 0.16 | 0.227 |
| C/C 2.5D with "modified SiC" resin | 2 | 0.319 | 0.42 |

This table shows that the higher the oxidation speed, the lower the density.

In every case, the SiC powder composite oxidizes more slowly than the non-surface-treated C/C; the oxygen flows applied become close to those applied to a material with AOP.

The slowest oxidation speeds are obtained for the SiC powder composite. It leads to an ablation speed from 3 to 4 times slower than that of the non-surface-treated C/C. Also, the ablation decreases over time.

The "modified SiC" resin material has a weight loss and an ablation speed twice that of the SiC powder composite, hence the interest in using powdered crystalline SiC.

A micrographic study made it possible to show that for a non-surface-treated C/C material, oxidation takes place on the surface and not at a certain depth of the material, and that surface followed the macroporosities of the material. There is therefore an oxidation "front."

In all the tests, for oxidation below around 1700° C., for the C/C material with SiC powder, a "cushion" formation was found; this cushion is shaped like the porosities of the material, i.e., like "pockets," inter-strand spaces, inter-strand macrocracks. After oxidation, these macroporosities produce walls; the spaces between the walls correspond to the dense part of the strands, and the filaments are very close together.

Moreover, the oxidation surface is relatively plane and parallel to the initial surface.

An analysis of the cushion shows that it is composed of SiC oxidized into porous $SiO_2$.

Above 1700° C., there is no more cushion formation. More probably, it collapses and a layer is formed by fusion that covers the healthy composite and leads to piercing.

It was found also that there is no longer the same idea of an oxidation front of the carbon-carbon as described previously for the composites with a matrix without SiC powder, but a diffuse oxidation interface is obtained (hence the idea of gaseous diffusion barrier).

Note that the grains of SiC are bonded together by oxidation and by their associated inflation. Note also that this material has great porosity, which shows that the material did not collapse.

The same results were obtained for a composite surface-treated with SiC powder according to the invention, whose resin is a "modified SiC" resin, as were obtained with a non-modified resin. This shows the importance of adding the SiC in the form of crystalline powder to the porosities of the matrix.

The composite parts in the invention can resist up to 1700° C. without external protection. Above 1700° C., the film of $SiO_2$ formed by oxidation of the SiC powder reacts with the residual SiC producing volatile SiO. And the silicon becomes liquid and can no longer form a solid protective film.

I claim:

1. A process for manufacturing a structural part made of carbon-carbon type composite, protected against oxidation, which consists of:
    (a) making a fibrous preform of the part consisting essentially of fibers, said fibers being carbon fibers;
    (b) impregnating this preform with an impregnation bath containing a carbon precursor resin and ultra-fine crystalline SiC powder, with the amount of SiC powder in the bath being such that the powder represents 5% to 30% by weight of the densified preform;
    (c) polymerizing the resin of the loaded preform, then pyrolyzing it to convert it into carbon and thus densify the loaded preform.

2. A manufacturing process for a structural part made of a composite of the type carbon/carbon protected against oxidation, composed of a fibrous preform immersed in a matrix that consists of:

(A) impregnating at least one carbon fiber with an impregnation bath containing a carbon precursor resin and ultrafine crystalline SiC powder, with the amount of powder in the bath being such that the powder represents from 5% to 30% by weight of the densified preform;

(B) making a fibrous preform of the part solely from this impregnated carbon fiber;

(C) polymerizing the resin of the loaded preform then pyrolyzing it to convert it into carbon and thus densify the loaded preform.

3. A process according to claim 1 or 2, characterized by the fact that it also includes at least one additional densification cycle with carbon.

4. A process according to claim 3, characterized by the fact that the additional densification cycle consists of impregnating the preform loaded with SiC and carbon with a carbon precursor resin, and polymerizing that resin and then pyrolyzing it.

5. A process according to claim 3, characterized by the fact that the additional densification cycle consists of impregnating the preform loaded with SiC and carbon with pitch or carrying out chemical vapor deposition with carbon.

6. A process according to claim 1 or 2, characterized by the fact that the impregnation with the resin loaded with SiC is carried out in the presence of a solvent that reduces the viscosity of the mixture.

7. A process according to claim 1 or 2, characterized by the fact that the impregnation bath contains for 100 parts by weight resin from 10 to 100 parts by weight SiC powder and from 0 to 10 parts by weight solvent.

8. A process according to claim 1 or 2, characterized by the fact that at least one external ceramic coating is deposited on the external surface of the part.

9. A process for protection against oxidation from an oxidizing gaseous flow (12) up to 1700° C. for a composite with carbon fibers (4) bonded to one another by a carbon matrix (6) consisting of forming in the matrix a gaseous diffusion barrier (14) of porous $SiO_2$ by converting an ultrafine crystalline SiC powder (10), placed in the porous spaces (7, 8) of the matrix at the rate of 5% to 30% by weight of the fiber-matrix-powder unit.

10. A process according to claim 9, characterized by the fact that the powder has a granulometry less than 1/10 of the diameter of the fibers.

11. A process according to claim 9, characterized by the fact that the fiber-matrix unit is covered with at least one external ceramic coating (30, 32).

12. A process according to claim 11, characterized by the fact that the external coating is a coating of silicon carbide (30).

13. A process according to claim 12, characterized by the fact that the silicon carbide coating (30) is covered with a final coating of refractory oxide (36).

14. A process according to claim 11, characterized by the fact that the external coating is a coating of refractory oxide (32).

15. A process according to claim 13, characterized by the fact that an intermediate coating of reaction barrier is provided between the oxide coating (32) and the underlying material (30, 6).

16. A process according to claim 9, characterized by the fact that the oxidizing flow is an air flow.

* * * * *